(12) United States Patent
Fujinawa

(10) Patent No.: US 7,154,209 B2
(45) Date of Patent: Dec. 26, 2006

(54) CONTROL METHOD AND APPARATUS OF AN ULTRASONIC MOTOR, AND AN ULTRASONIC MOTOR DRIVER AND CONTROLLER

(75) Inventor: Tadashi Fujinawa, Sakado (JP)

(73) Assignee: Hephaist Seiko Co. Ltd, Saitama (JP)

( * ) Notice: Subject to any disclaimer, the term of this patent is extended or adjusted under 35 U.S.C. 154(b) by 185 days.

(21) Appl. No.: 10/737,632

(22) Filed: Dec. 16, 2003

(65) Prior Publication Data

US 2004/0164646 A1    Aug. 26, 2004

(30) Foreign Application Priority Data

| Dec. 18, 2002 | (JP) | ............................ 2002-366699 |
| Jan. 10, 2003 | (JP) | ............................ 2003-004695 |

(51) Int. Cl.
   *H01L 41/09* (2006.01)

(52) U.S. Cl. .................................................... 310/317

(58) Field of Classification Search ........... 310/316.01, 310/317
   See application file for complete search history.

(56) References Cited

U.S. PATENT DOCUMENTS

| 5,731,652 | A | * | 3/1998 | Shimada ................ 310/316.01 |
| 6,215,223 | B1 | * | 4/2001 | Furukoshi et al. ..... 310/316.01 |
| 6,476,537 | B1 | | 11/2002 | Pease et al. |
| 2002/0024268 | A1 | * | 2/2002 | Yagi ....................... 310/316.01 |
| 2002/0175592 | A1 | * | 11/2002 | Murphy et al. ........ 310/316.01 |
| 2004/0007943 | A1 | * | 1/2004 | Iino et al. .............. 310/316.01 |
| 2004/0201308 | A1 | * | 10/2004 | Kasai ......................... 310/317 |

FOREIGN PATENT DOCUMENTS

| EP | 0 564 228 | 10/1993 |
| EP | 1 179 493 | 2/2002 |
| JP | 03-220932 | 9/1991 |
| JP | 11-150962 | 6/1999 |

* cited by examiner

*Primary Examiner*—Thomas M. Dougherty
(74) *Attorney, Agent, or Firm*—RatnerPrestia

(57) ABSTRACT

A control apparatus of an ultrasonic motor, comprises a driving wave number determining means for determining a driving wave number based on the targeted displacement of a driven object driven by the ultrasonic motor, a normative driving wave generating means for generating continuously normative driving waves in the number of times determined at the driving wave number determining means, inserted an interval determined based on the targeted velocity of the driven object, every at least one cycle of the normative driving waves, and a driving wave generating means for generating driving waves having the predetermined frequency and the predetermined amplitude based on the normative driving waves generated at the normative driving wave generating means.

8 Claims, 16 Drawing Sheets

CONTROL METHOD AND APPARATUS OF AN ULTRASONIC MOTOR, AND AN ULTRASONIC MOTOR DRIVER AND CONTROLLER

RELATED APPLICATIONS

This application claims priority of Japanese application serial number 2002-366699 and Japanese application serial number 2003-004695, the contents of both being incorporated herein by reference in their entirety.

BACKGROUND OF THE INVENTION

1. Field of the Invention

The present invention relates to a control method and apparatus of an ultrasonic motor, and an ultrasonic motor driver and controller, especially to a control method and apparatus of an ultrasonic motor, and an ultrasonic motor driver and controller enabling to control accurately the displacement and/or the velocity of a driven object driven by the ultrasonic motor.

2. Description of the Related Art

An ultrasonic motor consists of a piezoelectric element, which makes elastic movement when a voltage is applied across the piezoelectric element, and an elastic body, which transfers the elastic motion of the piezoelectric element to a driven object driven by the ultrasonic motor.

The ultrasonic motor drives the driven object linearly, by applying an alternative voltage to vibrate the piezoelectric element with the elastic body contacting to the driven object.

When the ultrasonic motor is applied to drive a stage of a microscope, it is necessary to control accurately the displacement and the velocity of the stage in order to put an inspecting object in perspective of the microscope.

Up until now, the velocity of the driven object was controlled by a voltage, a frequency, and a phase of the electric power applied to the ultrasonic motor, and the displacement of the driven object was controlled by the number of the driving waves applied to the ultrasonic motor (See Japanese unexamined patent publication No. 11-150962).

The above-mentioned control method, however, cannot accurately control the displacement and/or the velocity of the driven object, because of the characteristic difference between individual ultrasonic motors and the difference of contacting status of the ultrasonic motor to the driven object.

Therefore, various control methods and apparatuses of the ultrasonic motor have been proposed to improve control accuracy.

For example, there has been proposed the apparatus to control the velocity of the driven object by making a means to change the frequency of the driving waves supplied to the ultrasonic motor active while the amplitude of the driving waves is kept at constant, and a means to change the amplitude active while the frequency is kept at constant (See Japanese Patent No. 3220932)

It is difficult, however, to dissolve the following problems with the above-mentioned apparatus.

1. The ultrasonic motor cannot accurately control the displacement of the driven object, when driving waves are continuously supplied, because the friction force changes considerably at the beginning and ending of the displacement of the driven object.

2. The relationship between the change of the frequency of the driving waves and the change of the velocity of the driven object is not linear but nonlinear, and the nonlinear characteristic cannot be explicitly understood.

3. The velocity of the driven object becomes faster as the amplitude of the driving waves is larger, but the displacement resolution is deteriorated concurrently because the displacement of the driven object per one driving wave becomes large.

SUMMARY OF THE INVENTION

It is, therefore, an object of the present invention to provide a control method and apparatus of an ultrasonic motor enabling to control accurately the displacement and/or the velocity of a driven object driven by an ultrasonic motor.

It is another object of the present invention to provide a ultrasonic motor driver enabling to control accurately the number of times and the operating velocity of the ultrasonic motor.

It is a further object of the present invention to provide an ultrasonic motor controller enabling to control accurately the displacement and/or the velocity of the driven object driven by the ultrasonic motor.

According to one aspect of the present invention, there is provided a control apparatus of an ultrasonic motor, comprising: a driving pulse receiving means for receiving one or a plurality of driving pulses to energize an ultrasonic motor which drives a driven object every predetermined interval; a normative driving wave generating means for generating continuously normative driving waves, the numbers of which are equal to the numbers of driving pulses received at the driving pulse receiving means multiplied by a predetermined number; and a driving wave generating means for generating driving waves having a predetermined frequency and a predetermined amplitude based on the normative driving waves generated at the normative driving wave generating means.

The controller of the ultrasonic motor thus constructed can accurately displace the driven object, because the driving waves are supplied every a predetermined interval.

According to another aspect of the present invention, there is provided a control apparatus of an ultrasonic motor, comprising: a driving wave number determining means for determining a driving wave number based on the targeted displacement of a driven object driven by the ultrasonic motor; a normative driving wave generating means for generating continuously normative driving waves in the number of times determined at the driving wave number determining means, inserted an interval determined based on the targeted velocity of the driven object, every at least one cycle of the normative driving waves; and a driving wave generating means for generating driving waves having the predetermined frequency and the predetermined amplitude based on the normative driving waves generated at the normative driving wave generating means.

The normative driving wave generating means may make the interval longer as the targeted velocity of the driven object is smaller.

The controller of the ultrasonic motor thus constructed can accurately displace the driven object based on the targeted displacement, because the driving waves in the number of times determined based on the targeted displacement are supplied every a predetermined interval.

According to the further aspect of the present invention, there is provided a control apparatus of an ultrasonic motor, comprising; a displacement deviation calculating means for calculating a displacement deviation defined by a deviation between the targeted displacement of a driven object driven by the ultrasonic motor and the actual displacement of the driven object; a driving wave number determining means for determining a driving wave number based on the displacement deviation calculated at the displacement deviation calculating means; a normative driving wave generating means for generating continuously normative driving waves in the number of times determined at the driving wave number determining means, inserted an interval determined based on the targeted velocity of the driven object, every at least one cycle of the normative driving waves; and a driving wave generating means for generating driving waves having the predetermined frequency and the predetermined amplitude based on the normative driving waves generated at the normative driving wave generating means.

The normative driving wave generating means may make the interval longer as the targeted velocity of the driven object is smaller.

The controller of the ultrasonic motor thus constructed can accurately control the displacement of the driven object so that the actual displacement corresponds to the targeted displacement, because the driving waves in the number of times determined based on the displacement deviation are supplied every a predetermined interval.

According to a further aspect of the present invention, there is provided a control apparatus of an ultrasonic motor, comprising; a displacement deviation calculating means for calculating a displacement deviation defined by a deviation between the targeted displacement of a driven object driven by the ultrasonic motor and the actual displacement of the driven object; a driving wave number determining means for determining a driving wave number based on the displacement deviation calculated at the displacement deviation calculating means; a velocity deviation calculating means for calculating a velocity deviation defined by a deviation between the targeted velocity of the driven object and the actual velocity of the driven object; a normative driving wave generating means for generating continuously normative driving waves in the number of times determined at the driving wave number determining means, inserted an interval determined based on the velocity deviation calculated at the velocity deviation calculating means, every at least one cycle of the normative driving waves; and a driving wave generating means for generating driving waves having the predetermined frequency and the predetermined amplitude based on the normative driving waves generated at the normative driving wave generating means.

The normative driving wave generating means may make the interval longer as the targeted velocity of the driven object is smaller.

The controller of the ultrasonic motor thus constructed can accurately control the displacement and velocity of the driven object so that the actual displacement and velocity correspond to the targeted displacement and velocity, because the driving waves in the number of times determined based on the displacement deviation are supplied every a interval determined based on the velocity deviation.

According to a further aspect of the present invention, there is provided an ultrasonic motor driver, comprising: a driving pulse receiving part to receive one or a plurality of driving pulses to energize an ultrasonic motor which drives a driven object every predetermined interval; a multiplier setting part to set a multiplier; a manual-mode normative driving wave generating part to generate continuously manual-mode normative driving waves, the numbers of which are equal to the numbers of driving pulses received at the driving pulse receiving part multiplied by the multiplier set at the multiplier setting part; a targeted displacement receiving part to receive a targeted displacement of the driven object; a displacement deviation calculating part to calculate a displacement deviation defined by a deviation between the targeted displacement received by the targeted displacement receiving part and the actual displacement of the driven object; a displacement control signal choosing part to choose between the targeted displacement received by said targeted displacement receiving part and the displacement deviation calculated by the displacement deviation calculating part, as a displacement control signal; a driving wave number determining part to determine a driving wave number based on the displacement control signal chosen by the displacement control signal choosing part; a targeted velocity receiving part to receive a targeted velocity of the driven object; a velocity deviation calculating part to calculate a velocity deviation defined by a deviation between the targeted velocity received by the targeted velocity receiving part and the actual velocity of the driven object; a velocity control signal choosing part to choose between the targeted velocity received by the targeted velocity receiving part and the velocity deviation calculated by the velocity deviation calculating part, as a velocity control signal; an auto-mode normative driving wave generating part to generate continuously auto-mode normative driving waves in the number of times determined by the driving wave number determining part, inserted an interval determined based on the velocity control signal chosen by the velocity control signal choosing part, every at least one cycle of the auto-mode normative driving waves; a normative driving wave choosing part to choose normative driving waves between the manual-mode normative driving waves and the auto-mode normative driving waves; and a driving wave generating part to generate driving waves having the predetermined frequency and the predetermined amplitude based on the normative driving waves chosen by the normative driving wave choosing part.

The normative driving wave generating part may make the interval longer as the targeted velocity of the driven object is smaller.

The driving wave generating part may include either at least one of a frequency changing part to change the frequency of the normative driving waves and an amplitude changing part to change the amplitude of the normative driving waves.

The ultrasonic motor controller such constructed can accurately control the driving number of times and the operating velocity of the ultrasonic motor driving the driven object.

According to a further aspect of the present invention, there is provided an ultrasonic motor controller, comprising: an ultrasonic motor driver comprised of a driving pulse receiving part to receive one or a plurality of driving pulses to energize an ultrasonic motor which drives a driven object every predetermined interval, a multiplier setting part to set a multiplier, a manual-mode normative driving wave generating part to generate continuously manual-mode normative driving waves, the numbers of which are equal to the numbers of driving pulses received at the driving pulse receiving part multiplied by the multiplier set at the multiplier setting part, a targeted displacement receiving part to receive a targeted displacement of the driven object, a displacement deviation calculating part to calculate a displacement deviation defined by a deviation between the targeted displacement received by the targeted displacement receiving part and the actual displacement of the driven object, a displacement control signal choosing part to choose between the targeted displacement received by the targeted displacement receiving part and the displacement deviation calculated by said displacement deviation calculating part, based on a displacement control choosing signal, a driving wave number determining part to determine driving wave number based on the displacement control signal chosen by the displacement control signal choosing part, a targeted velocity receiving part to receive a targeted velocity of the driven object, a velocity deviation calculating part to calculate a velocity deviation defined by a deviation between the targeted velocity received by the targeted velocity receiving part and the actual velocity of the driven object, a velocity control signal choosing part to choose between the targeted velocity received by said targeted velocity receiving part and the velocity deviation calculated by said velocity deviation calculating part, based on a velocity control choosing signal, an auto-mode normative driving wave generating part to generate continuously auto-mode normative driving waves in the number of times determined by the driving wave number determining part, inserted an interval determined based on the velocity control signal chosen by the velocity control signal choosing part, every at least one cycle of the auto-mode normative driving waves, a normative driving wave choosing part to choose between the manual-mode normative driving waves generated by the manual-mode normative driving waves and the auto-mode normative driving waves generated by the auto-mode normative driving waves based on a normative driving wave choosing signal, and a driving wave generating part to generate driving waves having the predetermined frequency and the predetermined amplitude based on the normative driving waves chosen by the normative driving wave choosing part;

a driving pulse generating part to generate the driving pulses supplied to the driving pulse receiving part; a multiplier changing part to change a multiplier set at the multiplier setting part; a targeted displacement generating part to generate the targeted displacement supplied to the targeted displacement receiving part; an actual displacement measuring part to measure the actual displacement of the driven object supplied to the displacement deviation calculating part; a displacement control mode choosing signal outputting part to output the displacement control mode choosing signal to the displacement control signal choosing part; a targeted velocity generating part to generate the targeted velocity supplied to the targeted velocity receiving part; an actual velocity measuring part to measure the actual velocity of the driven object supplied to the velocity deviation calculating part; a velocity control-mode choosing signal outputting part to output the velocity control-mode choosing signal to the velocity control signal choosing part; and a normative driving wave choosing signal outputting part to output the normative driving wave choosing signal to the a normative driving wave choosing part.

The normative driving wave generating part may make the interval longer as the targeted velocity of the driven object is smaller.

The driving wave generating part may include either at least one of a frequency changing part to change the frequency of the normative driving waves and an amplitude changing part to change the amplitude of the normative driving waves.

The ultrasonic motor controller thus constructed can accurately control the displacement and velocity of the driven object driven by the ultrasonic motor.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENT

Figure 1:
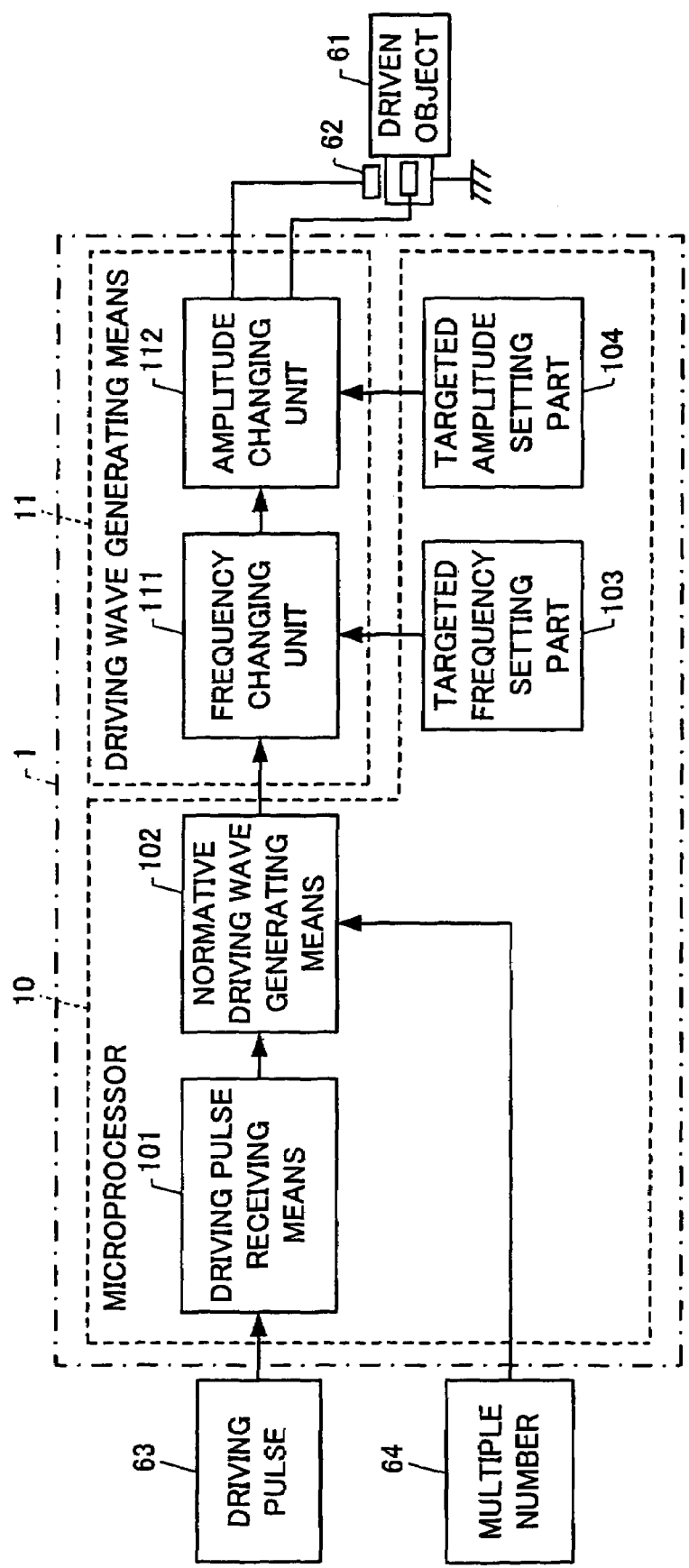
FIG. 1 is a block diagram of a first embodiment of the controller of the ultrasonic motor according to the present invention.
Figure 2:
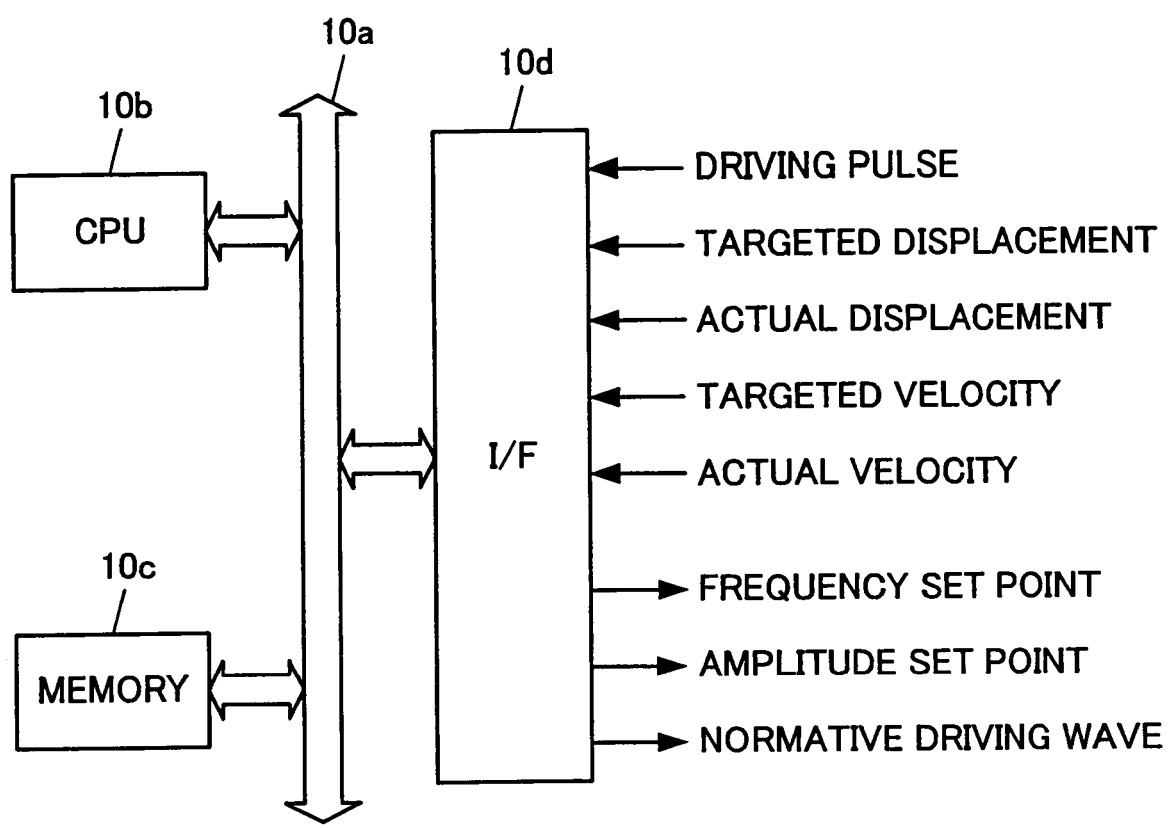
FIG. 2 is a block diagram of a microprocessor applied to the controller of the ultrasonic motor according to the present invention.

As shown in FIG. 1, a first embodiment of a control apparatus 1 of an ultrasonic motor according to the present invention includes a driving pulse receiving means 101 for receiving one or a plurality of driving pulses to energize an ultrasonic motor 62, which drives a driven object 61 every predetermined interval, a normative driving wave generating means 102 for generating continuously normative driving waves, the numbers of which are equal to the numbers of driving pulses received at the driving pulse receiving means 101 multiplied by a predetermined multiplier, and a driving wave generating means 11 for generating driving waves having a predetermined frequency and a predetermined amplitude based on the normative driving waves generated at the normative driving wave generating means 102.

The control apparatus is comprised of a microprocessor 10, which works as the driving pulse receiving means 101 and the normative driving wave generating means 102, and the driving wave generating means 11 is comprised of discrete elements.

The driving wave generating means 11 includes a frequency-changing unit 111 and an amplitude-changing unit 112.

The microprocessor 10 also works as a targeted frequency setting unit 103 and a targeted amplitude setting unit 104.

The microprocessor 10 consists of a CPU 10b, a memory 10c, and an interfaces 10d, which are connected each other by a bus 10a. The microprocessor 10 fetches driving pulses through the interface 10d, and outputs normative driving waves, and the targeted frequency and the targeted amplitude of the normative driving waves.

The driving pulses are generated at a driving pulse generating part 63, which consists of a rotary encoder, for example, and are transmitted to the driving pulse receiving means 101 in the microprocessor 10.through the interface 10d.

A multiplier is output from a multiplier setting part 64, which consists of a potentiometer, for example, and is transmitted to the normative driving wave generating means 102 in the microprocessor 10 through the interface 10d.

The normative driving wave generating means 102 is configured so as to determine the number of the normative driving waves n as the product of the number of driving pulses N received by the driving pulse receiving means 102 and the multiplier m set at the multiplier setting part 64 based on equation (1).

$$n = mN \tag{1}$$

The frequency-changing unit 111 in the driving wave generating means 11 is configured so as to generate the driving waves based on the normative driving waves generated at the normative driving wave generating means 102.

The frequency-changing unit 111 is configured so that the frequency of the driving waves can be changed by changing the targeted-frequency set at the targeted frequency setting part 103.

The amplitude-changing unit 112 in the driving wave generating means 11 is configured so as to generate a first driving waves having the same phase as the driving waves generated at the frequency-changing unit 111, and a second driving waves having a phase difference in 90 degrees to the driving waves in order to amplify the first driving waves and the second driving waves supplied to the ultrasonic motor 62.

The amplitude-changing unit 112 is configured so that the amplitude of the amplified first and second driving waves can be changed by changing the targeted amplitude set at the targeted-amplitude setting part 104.

The first and second driving waves output from the amplitude-changing unit 112 are supplied to the piezoelectric element of the ultrasonic motor 62. In result, the piezoelectric element moves elliptically, and drives the driven object 61 linearly.

For example, when 100 driving pulses are generated by operating the driving pulse generating part 63 every one second, the wave pattern of the normative driving waves generated at the normative driving wave generating means assumes the pattern of 1000 continuous driving waves to which a one second interval is added if the multiplier m is 10.

Figure 3:
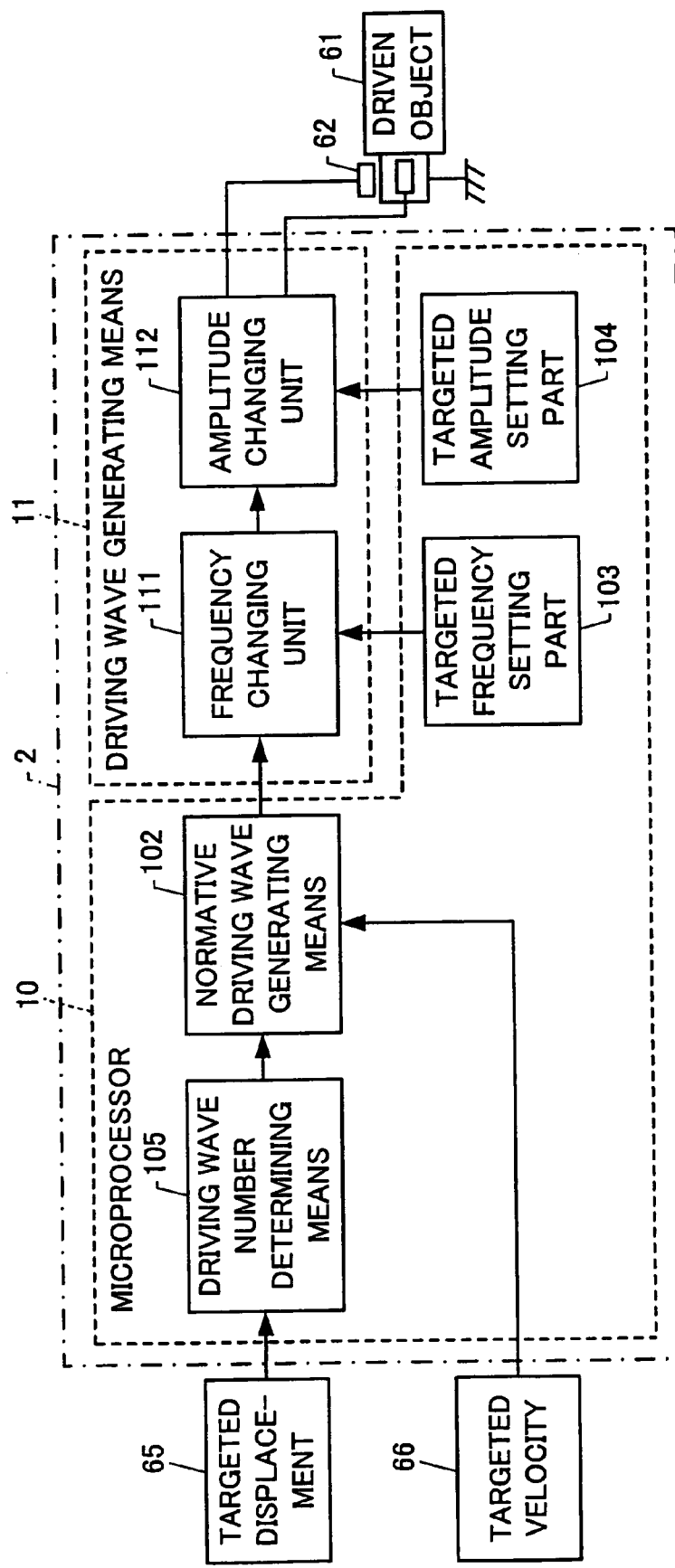
FIG. 3 is a block diagram of a second embodiment of the controller of the ultrasonic motor according to the present invention.

As shown in FIG. 3, a second embodiment of a control apparatus of an ultrasonic motor according to the present invention 2 includes a driving wave number determining means 105 for determining a driving wave number based on the targeted displacement of a driven object 61 driven by the ultrasonic motor 62, a normative driving wave generating means 102 for generating continuously normative driving waves in the number of times determined at the driving wave number determining means 105, inserted an interval determined based on the targeted velocity of the driven object 61, every at least one cycle of the normative driving waves, and a driving wave generating means 11 for generating driving waves having the predetermined frequency and the predetermined amplitude based on the normative driving waves generated at the normative driving wave generating means 102.

The control apparatus consists of a microprocessor 10, which works as the driving wave number determining means 105 and the normative driving wave generating means 102, and the driving wave generating means 11 consisting of discrete elements.

The driving wave generating means 11 includes a frequency-changing unit 111 and an amplitude-changing unit 112.

The microprocessor 10 also works as a targeted frequency setting part 103 and a targeted amplitude setting part 104.

The constituent elements of the second embodiment having the same function as the first embodiment are not explained in detail, by giving the same reference numerals.

Because the microprocessor 10 of this embodiment has the same configuration as the first embodiment, the explanation of the configuration of the microprocessor 10 is omitted.

The microprocessor 10 fetches a targeted displacement and a targeted velocity of the driven object 61 and outputs the normative driving waves, the targeted frequency and the targeted amplitude through the interface 10d.

The targeted displacement Xd is transferred from the targeted displacement setting part 65 consisting of a rotary encoder to the driving wave number determining means 105 in the microprocessor 10 through the interface 10d.

The driving wave number determining means 105 is configured so as to determine the number of times n of driving waves supplied to the ultrasonic motor 62 as the function of the targeted displacement Xd based on equation (2).

$$n = f(Xd) \tag{2}$$

The targeted velocity Vd is transferred from the targeted velocity setting part 66 consisting of another rotary encoder to the normative driving wave generating means 102 in the microprocessor 10 through the interface 10d.

The normative driving wave generating means 102 is configured so as to determine the interval D as the function of the targeted velocity Vd based on equation (3).

$$D = g(Vd) \tag{3}$$

It is necessary to make the interval D longer as the targeted velocity becomes smaller, and the interval D is a decreasing function of the targeted velocity Vd. When the period of the normative driving wave is defined as T, it is preferable to define the interval D as the product of the period T and h. Where, h is a decreasing function of the targeted velocity Vd.

Therefore, it is preferable to determine the interval D based on equation (4).

$$D = h(Vd) \times T \tag{4}$$

The normative driving wave generating means 102 is configured so as to insert the interval D determined based on equation (4), every at least one cycle of the normative driving waves.

Figure 4:
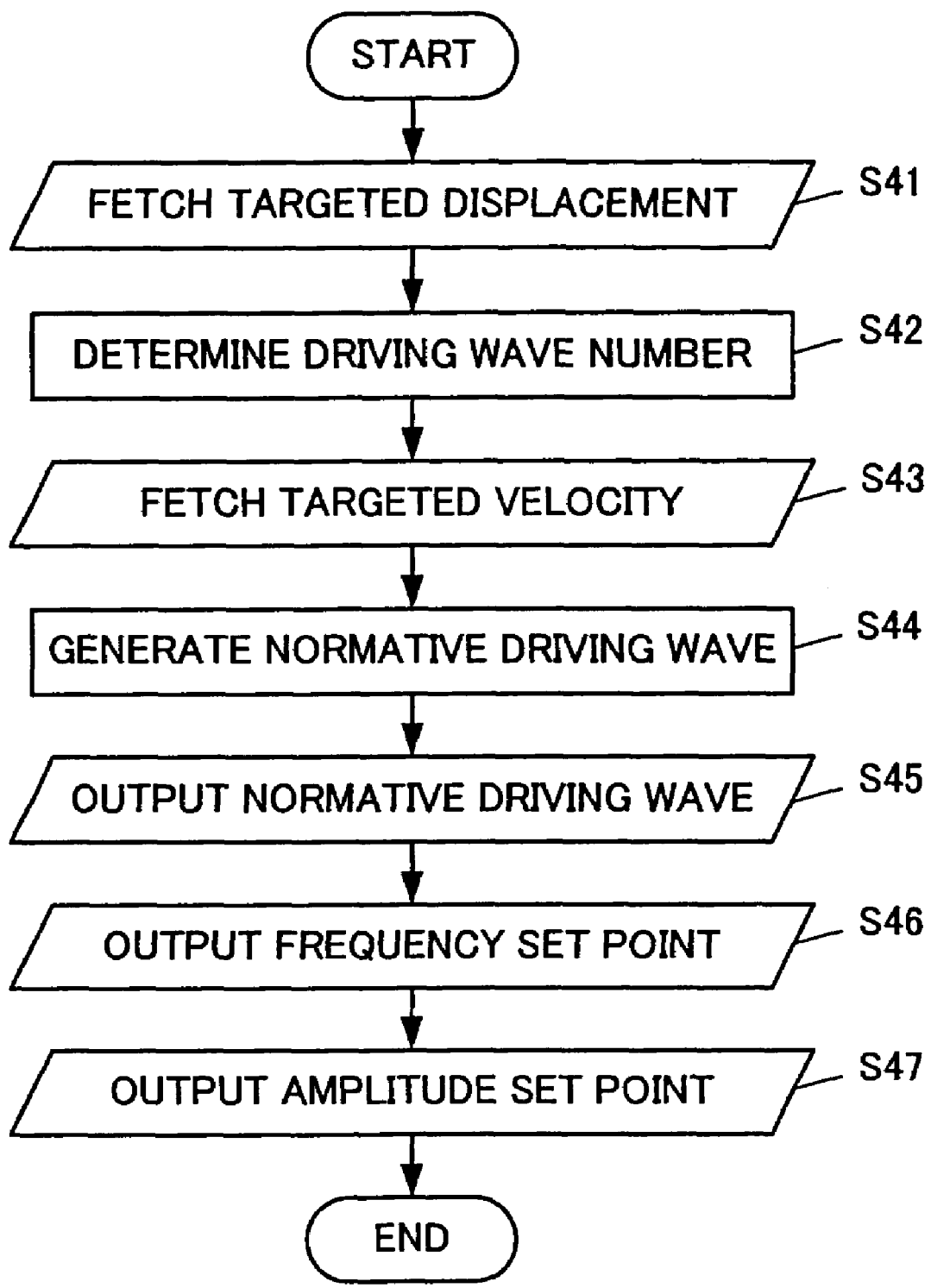
FIG. 4 is a flowchart of a first control program executed in the microprocessor of the second embodiment.

The microprocessor 10 executes the control program represented by the flowchart of FIG. 4, and works as the driving wave number determining means 105, the normative driving wave generating means 102, the targeted frequency setting means 103, and the targeted amplitude setting means 104.

The microprocessor 10 fetches the targeted displacement Xd from the targeted displacement setting part 65 at step S41, and determines the driving wave number based on the targeted displacement Xd at step S42.

Further, the microprocessor 10 fetches the targeted velocity Vd from the targeted velocity setting part 66 at step S43, and generates the normative driving waves in which the interval determined based on the targeted velocity Vd every at least one cycle of the normative driving waves at step S44.

Finally, the microprocessor 10 outputs the normative driving waves at step S45, the targeted frequency at step S46, and the targeted amplitude at step S47.

Figure 5A:
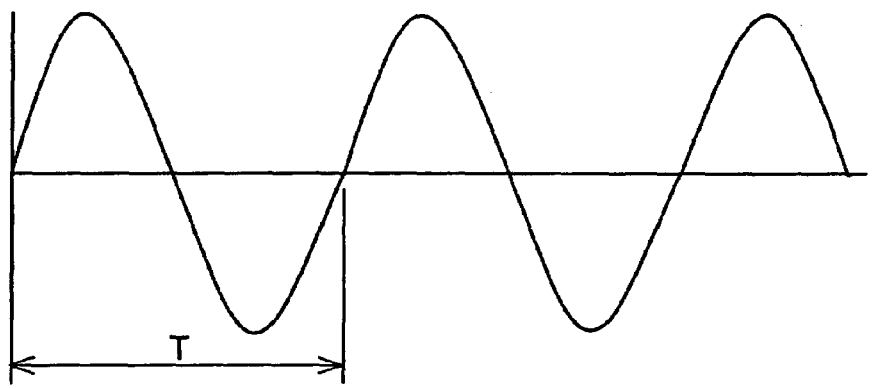
FIG. 5 and FIG. 6 are explaining drawings of wave shapes of the driving waves.

When the interval D is inserted every one cycle of the normative driving wave, the normative driving waves become continuous waves having a period T as shown in FIG. 5A, if h=0.

Figure 5B:
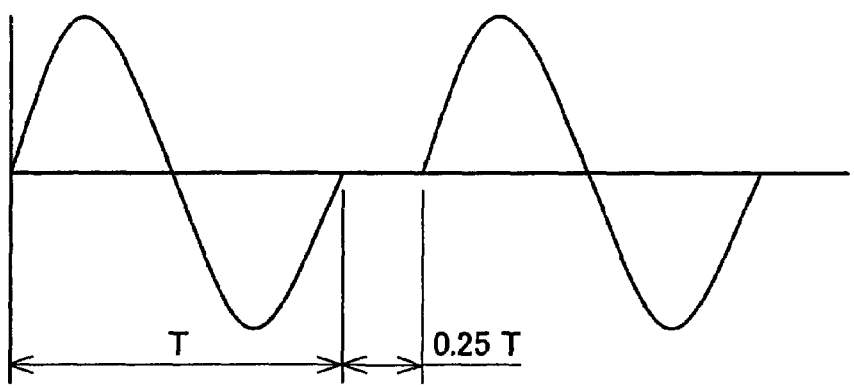

The interval having a 0.25 T length is inserted every one cycle of the normative driving wave as shown in FIG. 5B if h=0.25.

Figure 5C:
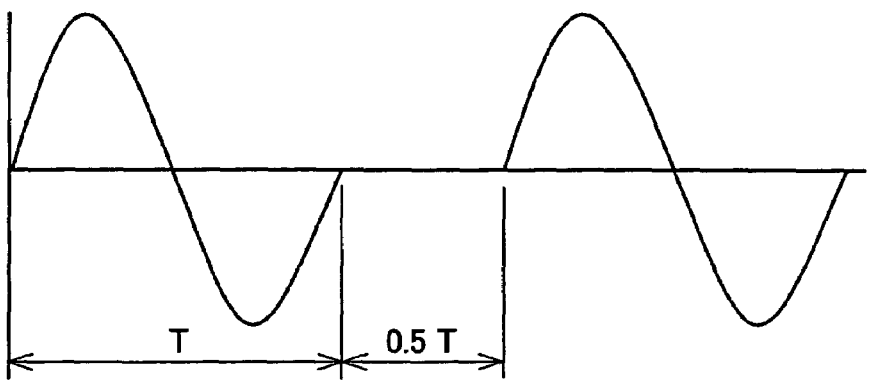

The interval having a 0.5 T length is inserted every one cycle of the normative driving wave as shown in FIG. 5C if h=0.5.

Figure 6A:
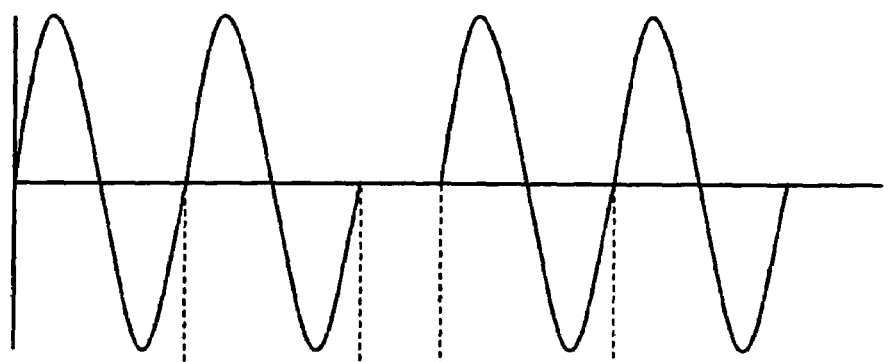
Figure 6B:
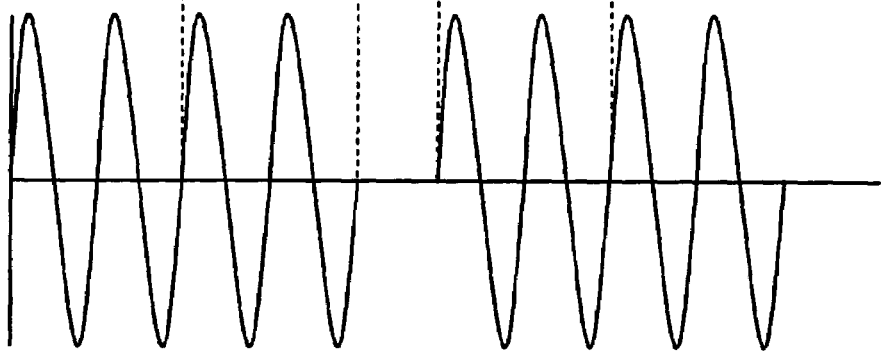

The interval may be inserted every two cycles of the normative driving waves as shown in FIG. 6A, and may be inserted every four cycles of the normative driving waves as shown in FIG. 6B.

Because the driving wave generating means 11 of this embodiment has the same configuration and function as the first embodiment, the explanation is omitted.

Figure 7:
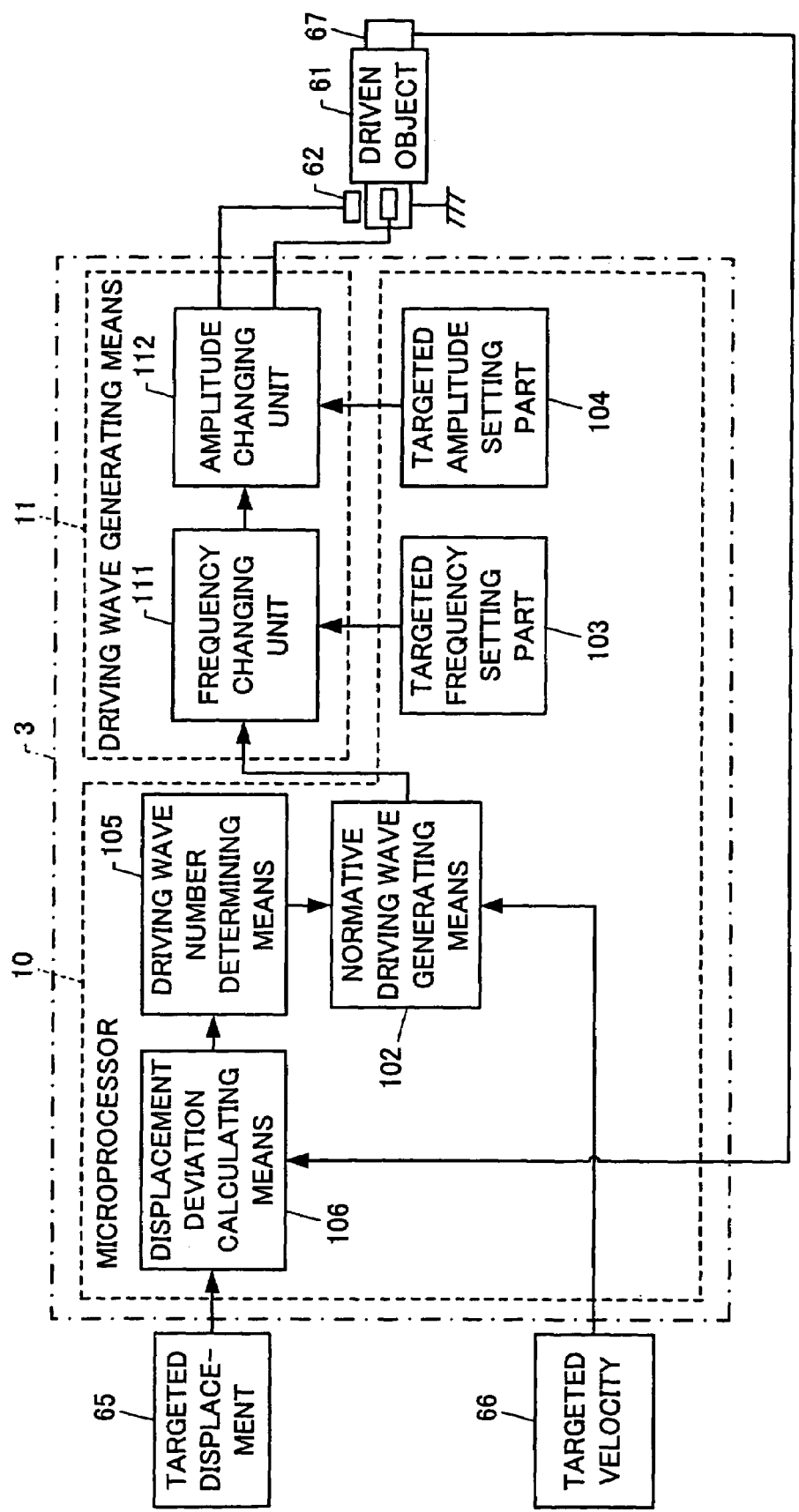
FIG. 7 is a block diagram of a third embodiment of the controller of the ultrasonic motor according to the present invention.

As shown in FIG. 7, a third embodiment of a control apparatus of an ultrasonic motor according to the present invention 3 includes a displacement deviation calculating means 106 for calculating a displacement deviation defined by a deviation between the targeted displacement of a driven object 61 driven by the ultrasonic motor 62 and the actual displacement of the driven object 61, a driving wave number determining means 105 for determining a driving wave number based on the displacement deviation calculated at the displacement deviation calculating means 106, a normative driving wave generating means 102 for generating continuously normative driving waves in the number of times determined at the driving wave number determining means 105, inserted an interval determined based on the targeted velocity of the driven object 61, every at least one cycle of the normative driving waves, and a driving wave generating means 11 for generating driving waves having the predetermined frequency and the predetermined amplitude based on the normative driving waves generated at the normative driving wave generating means 102.

The control apparatus consists of a microprocessor 10, which works as the displacement deviation calculating means 106, the driving wave number determining means 105 and the normative driving wave generating means 102, and the driving wave generating means 11 consisting of discrete elements.

The driving wave generating means 11 includes a frequency-changing unit 111 and an amplitude-changing unit 112.

The microprocessor 10 also works as a frequency setting part 103 and an amplitude setting part 104.

The constituent elements of the third embodiment having the same function as the second embodiment are not explained in detail, by giving the same reference numerals.

Because the hardware configuration of the microprocessor 10 is the same as the first embodiment, the explanation of the hardware configuration is omitted.

The targeted displacement Xd is transferred from the targeted displacement setting part 65 consisting of a rotary encoder to the displacement deviation calculating means 106 in the microprocessor 10 through the interface 10d.

An actual displacement measuring means 67 consisting of a linear encoder to measure the actual displacement of the driven object 61 is attached to the driven object 61, and feedbacks the actual displacement Xa of the driven object 61 to the displacement deviation calculating means 106.

The driving wave number determining means 105 is configured so as to determine the number n of driving waves supplied to the ultrasonic motor 62 as the function of the displacement deviation ed based on the following equation (5).

$$n=f(ed) \quad (5)$$

The targeted velocity Vd is transferred from the targeted velocity setting part 66 consisting of another rotary encoder to the normative driving wave generating means 102 in the microprocessor 10 through the interface 10d.

The normative driving wave generating means 102 is configured so as to determine the interval D as the function of the targeted velocity Vd based on equation (6).

$$D=h(Vd)T \quad (6)$$

The normative driving wave generating means 102 is configured so as to insert the interval D determined based on equation (6), every at least one cycle of the normative driving waves.

Figure 8:
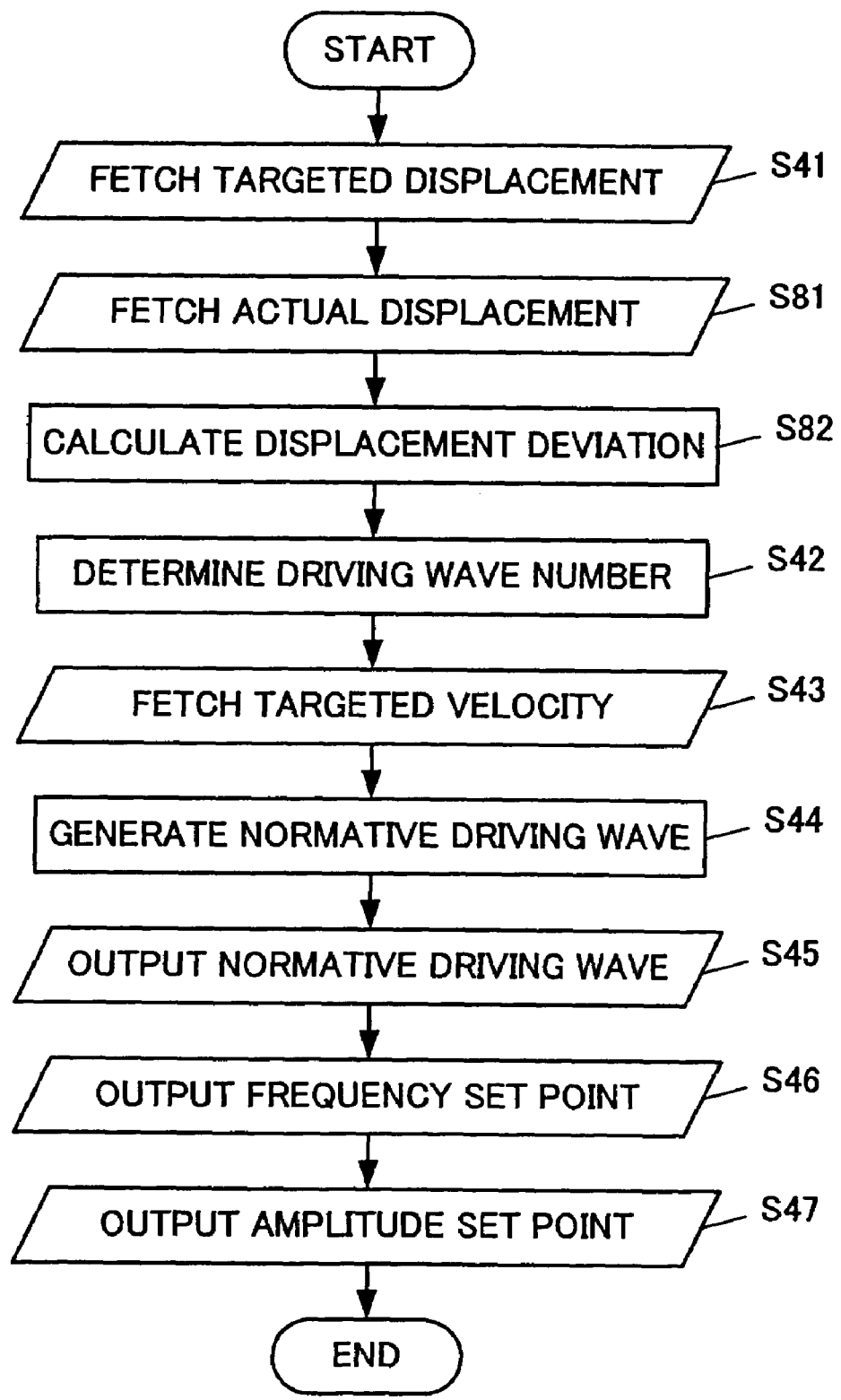
FIG. 8 is a flowchart of a second control program executed in the microprocessor of the third embodiment.

The microprocessor 10 executes the control program represented by the flowchart of FIG. 8, and functions as the displacement deviation calculating means 106, the driving wave number determining means 105, the normative driving wave generating means 102, the targeted frequency setting means 103, and the targeted amplitude setting means 104.

Because the program shown in FIG. 8 is the program shown in FIG. 4 to which step S81 and step S82 are added, the program behavior will be explained focus on step S81 and step S82.

The microprocessor 10 fetches the actual displacement Xa of the driven object 61 measured by the displacement measuring means 67 at step S81 after fetching the targeted displacement at step S41.

The microprocessor 10 subtracts the actual displacement Xa from the targeted displacement Xd to calculate the displacement deviation at step S82, and determines the driving wave number n based on equation (7).

$$n=f(ed) \quad (7)$$

The program behavior after step S43 is the same as that of FIG. 3, and the explanation is omitted.

The normative driving waves generated by the normative driving wave generating means 102 is supplied to the driving wave generating means 11, but the explanation of the driving wave generating means 11 is omitted because its behavior is the same as the controller according to the second invention.

Figure 9:
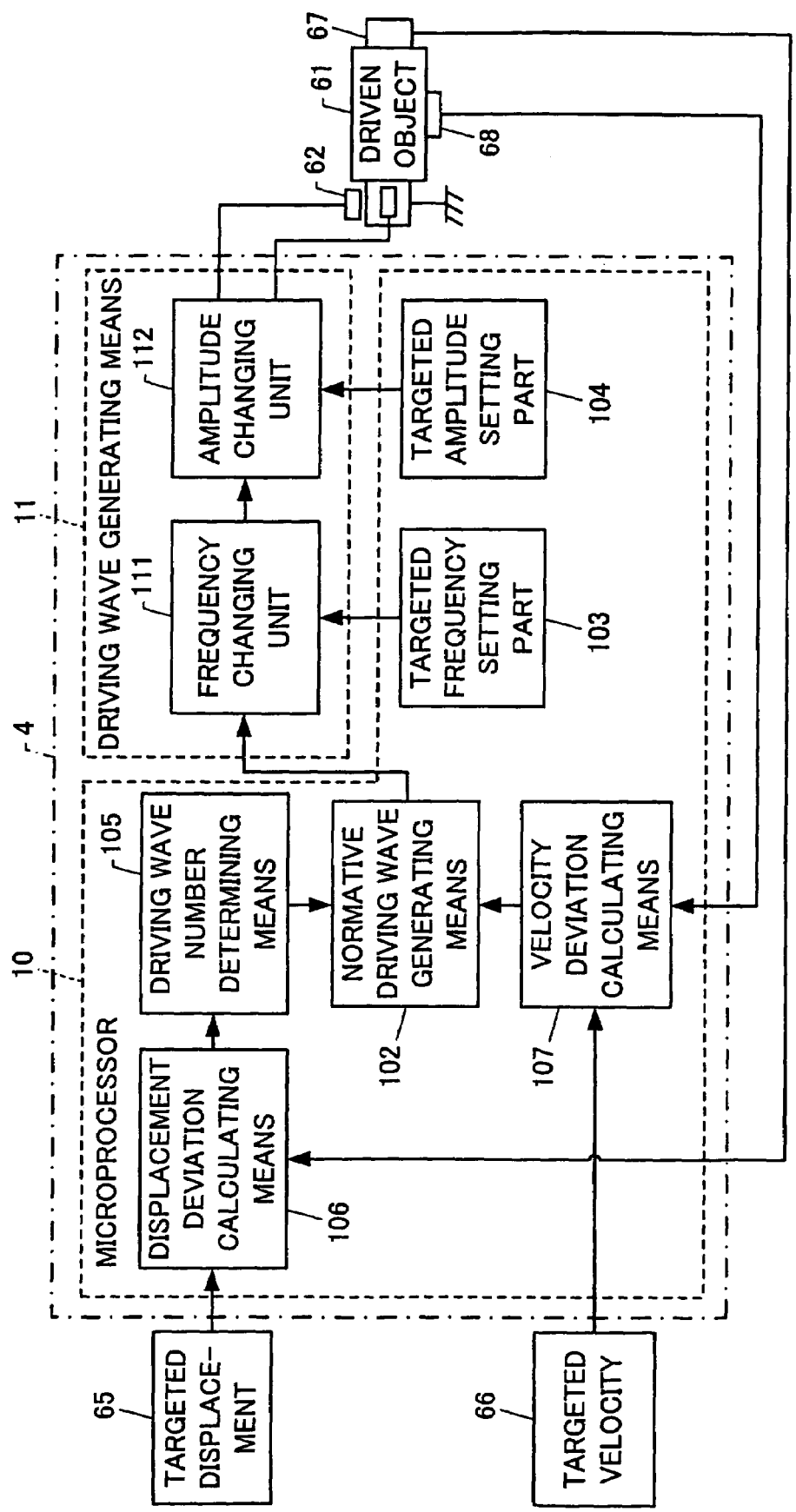
FIG. 9 is a block diagram of a forth embodiment of the controller of the ultrasonic motor according to the present invention.

As shown in FIG. 9, a forth embodiment of a control apparatus of an ultrasonic motor 4 according to the present invention includes a displacement deviation calculating means 106 for calculating a displacement deviation defined by a deviation between the targeted displacement of a driven object 61 driven by the ultrasonic motor 62 and the actual displacement of the driven object 61, a driving wave number determining means 105 for determining a driving wave number based on the displacement deviation calculated at the displacement deviation calculating means 106, a velocity deviation calculating means 107 for calculating a velocity deviation defined by a deviation between the targeted velocity of the driven object 61 and the actual velocity of the driven object 61, a normative driving wave generating means 102 for generating continuously normative driving waves in the number of times determined at the driving wave number determining means 105, inserted an interval determined based on the velocity deviation calculated at the velocity deviation calculating means 107, every at least one cycle of the normative driving waves, and a driving wave generating means 11 for generating driving waves having the predetermined frequency and the predetermined amplitude based on the normative driving waves generated at the normative driving wave generating means 106.

The control apparatus is comprised of a microprocessor 10, which works as the displacement deviation calculating means 106, the driving wave number determining means 105, the normative driving wave generating means 102 and the velocity displacement calculating means 107, and the driving wave generating means 11 consist of discrete elements.

The driving wave generating means 11 includes a frequency-changing unit 111 and an amplitude-changing unit 112.

Further, the microprocessor 10 works as a frequency setting part 103 and an amplitude setting part 104.

The constituent elements having the same function as the controller of the ultrasonic motor according to the third invention are not explained in detail, by giving the same reference numerals.

Because the hardware constitution of the microprocessor 10 is the same as the first embodiment of the ultrasonic motor, the explanation of the hardware constitution of the microprocessor 10 is omitted.

The targeted displacement Xd is transferred from the targeted displacement setting part 65 consisting of a rotary encoder to the displacement deviation calculating means 106 in the microprocessor 10 through the interface 10d.

An actual displacement measuring means 67 configured by a linear encoder to measure the actual displacement of the driven object 61 is attached to the driven object 61, and feedbacks the actual displacement Xa of the driven object 61 to the displacement deviation calculating means 106.

The displacement deviation calculating means 106 calculates a displacement deviation defined by the deviation between the targeted displacement Xd and the actual displacement Xa.

The driving wave number determining means 105 is configured so as to determine the number n of driving waves supplied to the ultrasonic motor 61 as the function of the displacement deviation Dd based on the following equation (8).

$$n=f(Dd) \quad (8)$$

The targeted velocity Vd is transferred from the targeted velocity setting part 66 consisting of another rotary encoder to the velocity deviation calculating means 107 in the microprocessor 10 through the interface 10d.

An actual velocity measuring means 68 to measure the actual velocity of the driven object 61 is attached to the driven object 61, and feedbacks the actual velocity Va of the driven object 61 to the velocity deviation calculating means 107.

The actual velocity may be determined by differentiating the actual displacement measured by the actual displacement measuring means 67 with respect to time, or by using a known observer.

The velocity deviation calculating means 107 calculates a velocity deviation Dv defined by the deviation between the targeted velocity Vd and the actual velocity Va supplied to the normative driving wave generating means 102.

The normative driving wave generating means 102 is configured so as to determine the interval D as the function of the velocity deviation Dv.

Actually, the interval D is calculated by compensating a normative interval Do with a compensating factor B which is a function of the velocity deviation Dv based on equation (9).

$$D=Do(1-B) \quad (9)$$

Figure 10:
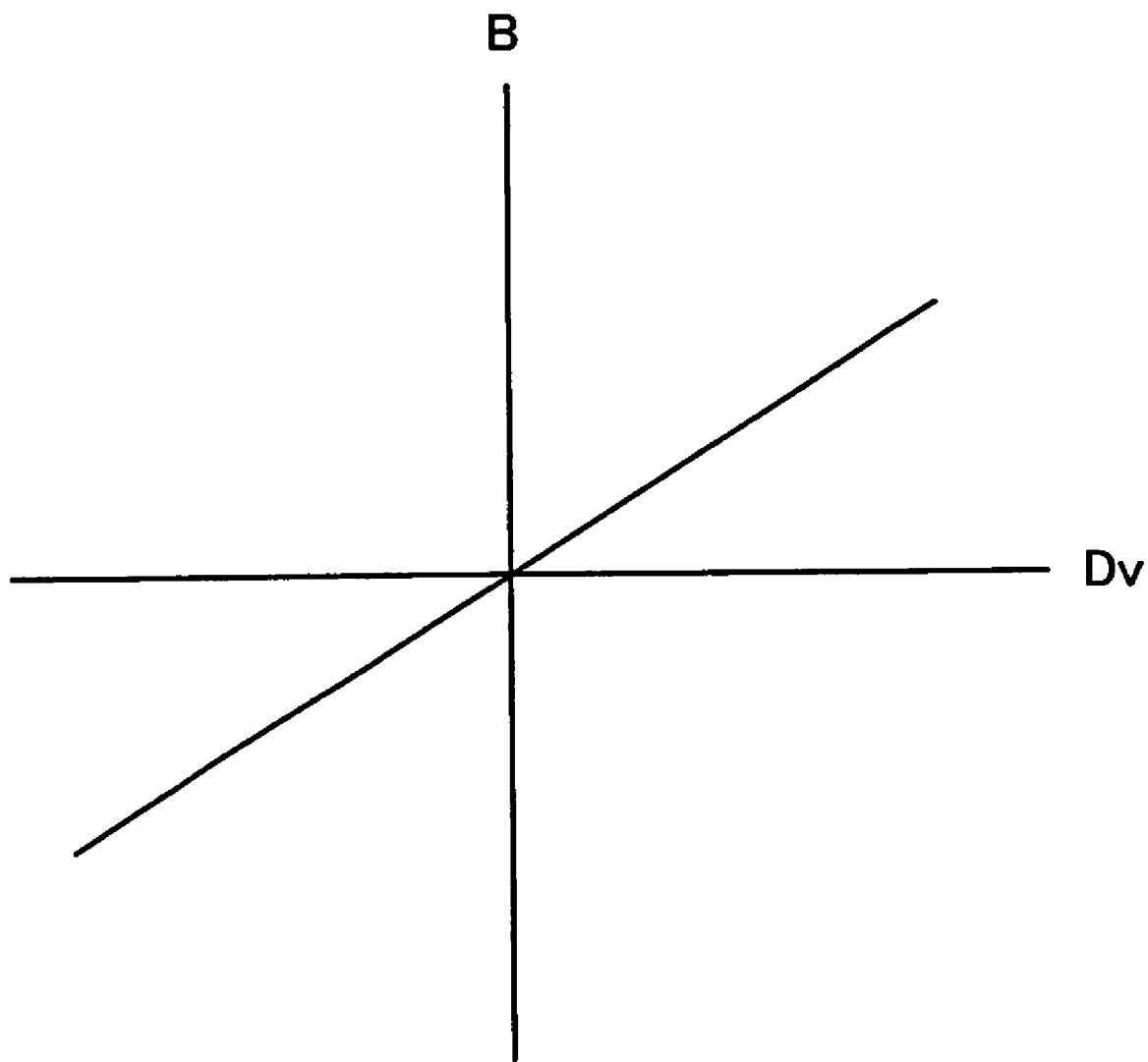
FIG. 10 is a graph showing a relationship between the velocity deviation and the coefficient β

The compensating factor B is defined as an increasing function of the velocity deviation Dv as shown in FIG. 10.

The normative driving wave generating means 102 is configured so as to generate the normative driving waves by inserting the interval D determined based on the equation (9), every at least one cycle of the normative driving waves.

Figure 11:
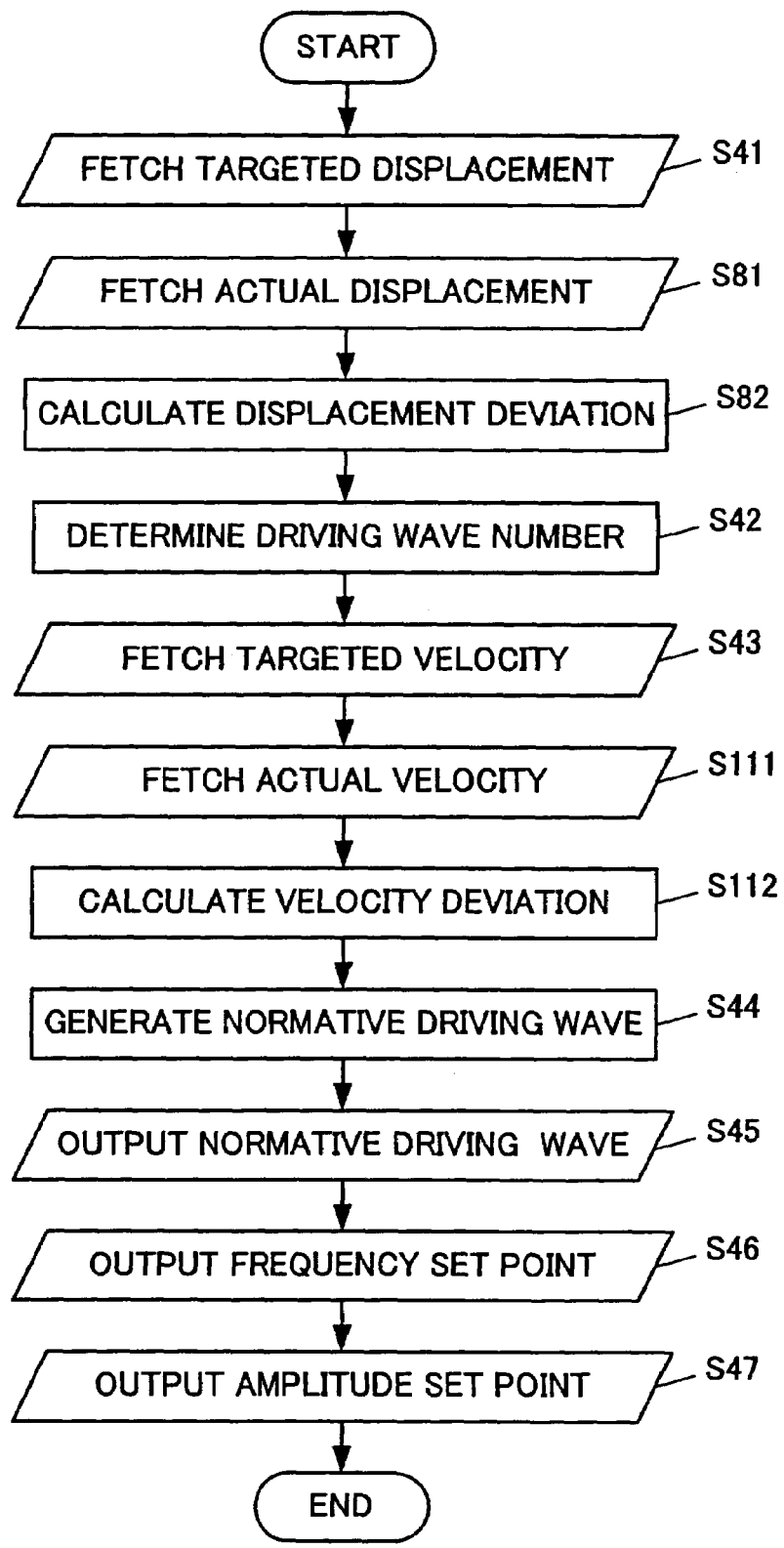
FIG. 11 is a flowchart of a third control program executed in the microprocessor of the controller of the forth embodiment.

The microprocessor 10 executes the program shown by the flowchart of FIG. 11, and functions as the displacement deviation calculating means 106, the driving wave number determining means 105, the normative driving wave generating means 102, the velocity deviation calculating means 107, the targeted frequency setting means 103, and the targeted amplitude setting means 104.

Because the program shown in FIG. 11 is the program shown in FIG. 8 to which step S111 and step S112 are added, the program behavior will be explained focus on step S111 and step S112.

Because the program behavior from step S41 to step S43 has been explained referring the flowchart shown in FIG. 8, the explanation is omitted.

The microprocessor 10 fetches the actual velocity Va of the driven object 61 measured by the actual velocity measuring means 68 at step S111 after fetching the targeted velocity Vd at step S43.

The microprocessor 10 subtracts the actual velocity Va from the targeted velocity Vd to calculate the velocity deviation Dv at step S112, and determines the interval D based on equation (10) at step S44.

$$D=Do(1-b) \quad (10)$$

Because the program behavior after step S45 has been explained referring the flowchart shown in FIG. 8, the explanation is omitted.

The normative driving waves generated by the normative driving wave generating means 102 is supplied to the driving wave generating means 11, and the explanation of the driving wave generating means 11 is omitted because its behavior is the same as the controller according to the second invention.

Figure 12:
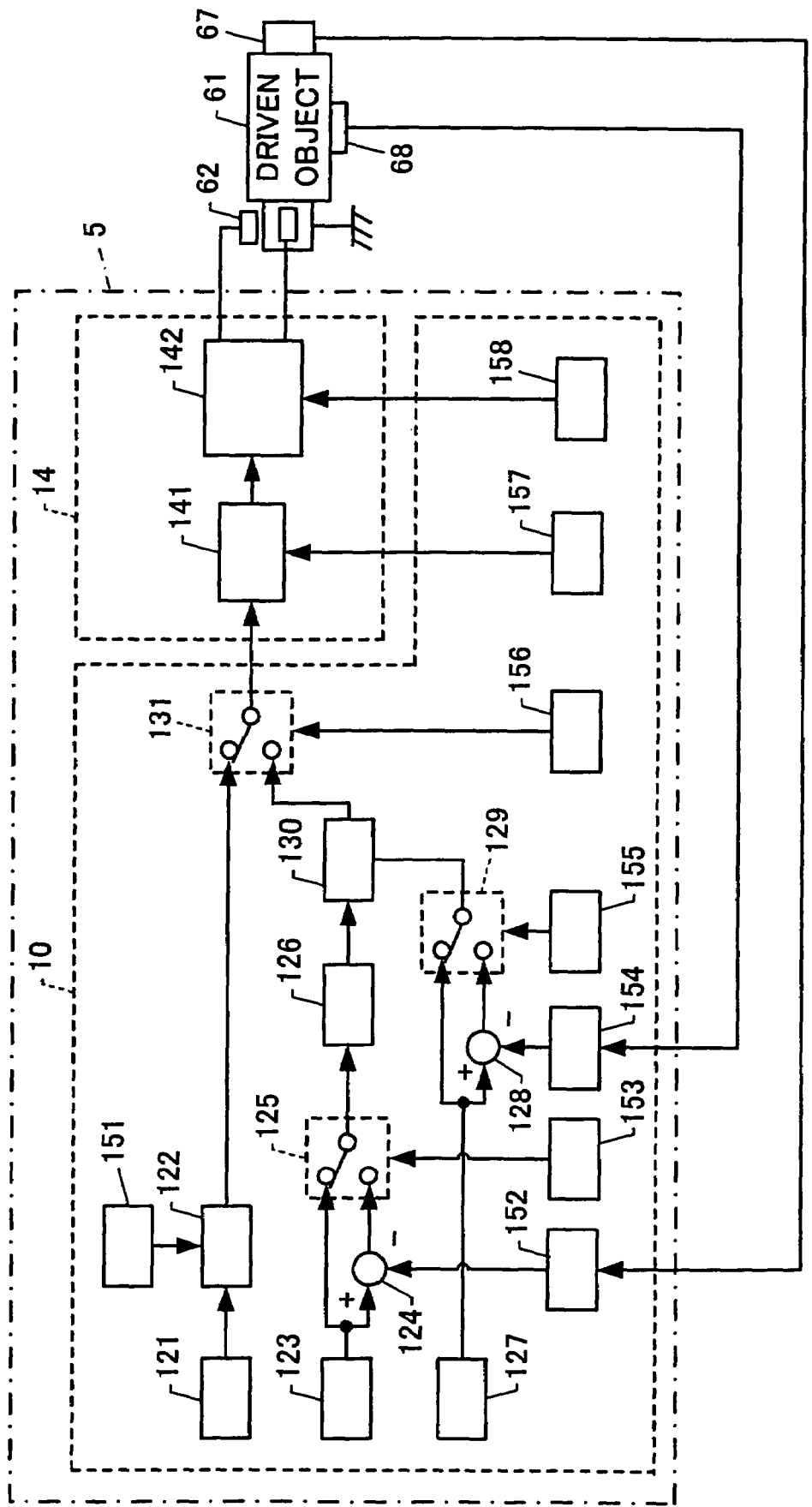
FIG. 12 is a block diagram of a fifth embodiment of the controller of the ultrasonic motor according to the present invention.

As shown in FIG. 12, a fifth embodiment of a control apparatus of an ultrasonic motor according to the present invention includes a driving pulse receiving part 121 to receive one or a plurality of driving pulses to energize an ultrasonic motor 16 which drives a driven object 61 every predetermined interval, a multiplier setting part 151 to set a multiplier, a manual-mode normative driving wave generating part 122 to generate continuously manual-mode normative driving waves, the numbers of which are equal to the numbers of driving pulses received at the driving pulse receiving part 121 multiplied by the multiplier set at the multiplier setting part 151.

The fifth embodiment further includes a targeted displacement receiving part 123 to receive a targeted displacement of the driven object 61, a displacement deviation calculating part 124 to calculate a displacement deviation defined by a deviation between the targeted displacement received by the targeted displacement receiving part 123 and the actual displacement of the driven object 61, a displacement control signal choosing part 125 to choose between the targeted displacement received by the targeted displacement receiving part 123 and the displacement deviation calculated by the displacement deviation calculating part 124, as a displacement control signal, a driving wave number determining part 126 to determine a driving wave number based on the displacement control signal chosen by the displacement control signal choosing part 125.

The fifth embodiment further includes a targeted velocity receiving part 127 to receive a targeted velocity of the driven object 61, a velocity deviation calculating part 128 to calculate a velocity deviation defined by a deviation between the targeted velocity received by the targeted velocity receiving part 127 and the actual velocity of the driven object 61, a velocity control signal choosing part 129 to choose between the targeted velocity received by said targeted velocity receiving part 127 and the velocity deviation calculated by the velocity deviation calculating part 128, as a velocity control signal, an auto-mode normative driving wave generating part 130 to generate continuously auto-mode normative driving waves in the number of times determined by the driving wave number determining part 126, inserted an interval determined based on the velocity control signal chosen by the velocity control signal choosing part 129, every at least one cycle of the auto-mode normative driving waves.

The fifth embodiment further includes a normative driving wave choosing part 131 to choose normative driving waves between the manual-mode normative driving waves generated by the manual-mode normative driving wave generating part 122 and the auto-mode normative driving waves generated by the auto-mode normative driving wave generating part 139, and a driving wave generating part 14 to generate driving waves having the predetermined frequency and the predetermined amplitude based on the normative driving waves chosen by said normative driving wave choosing part.

The control apparatus is comprised of a microprocessor 12, and the driving wave generating means 14 consists of discrete elements.

The driving pulse receiving part 121 receives the driving pulses generated by the driving pulse generating part consisting of a rotary encoder to output the driving pulses to the manual-mode normative driving wave generating means 122.

The manual-mode normative driving wave generating means 122 multiplies the number of the driving pulses by the multiplier set at the multiplier setting part 151 to output the product to one terminal of the normative driving wave choosing part 131.

The targeted displacement receiving part 123 receives the targeted displacement generated by the targeted displacement generating part consisting of a rotary encoder, and outputs the targeted displacement to the displacement deviation calculating part 124 and one terminal of the displacement control signal choosing part 125.

The displacement deviation calculating part 124 calculates the displacement deviation Dd defined by the deviation between the targeted displacement Xd and the actual displacement Xa fetched from the actual displacement receiving part 152 to output the displacement deviation Dd to other terminal of the displacement control mode choosing part 125.

The displacement control signal choosing part 125 outputs the targeted displacement Xd or the displacement deviation Dd depending on the displacement control mode choosing signal received by the displacement control-mode choosing signal receiving part 153.

When the targeted displacement control mode is selected, the driving wave number determining part 126 determines the driving wave number n as the function of the targeted displacement Xd based on equation (11), and outputs the driving wave number n to the auto-mode normative driving wave generating part 130.

$$n = f(Xd) \tag{11}$$

When the displacement deviation control mode is selected, the driving wave number determining part 126 determines the driving wave number n as the function of the displacement deviation Dd based on equation (12), and outputs the driving wave number n to the auto-mode normative driving wave generating part 130.

$$n = f(Dd) \tag{12}$$

The targeted velocity receiving part 127 receives the targeted velocity generated by the targeted velocity generating part consisting of a rotary encoder, and outputs the targeted velocity to the velocity deviation calculating part 128 and one terminal of the velocity control signal choosing part 129.

The velocity deviation calculating part 128 calculates the velocity deviation Dv defined by the deviation between the targeted velocity Vd and the actual velocity Va fetched from the actual velocity receiving part 154 to output the velocity deviation Dv to other terminal of the velocity control mode choosing part 129.

The velocity control signal choosing part 129 outputs the targeted displacement Xd or the displacement deviation Dd depending on the displacement control mode choosing signal received by the displacement control signal choosing signal receiving part 155.

When the targeted velocity control mode is selected, the auto-mode normative driving wave generating part 130 generates the auto-mode driving waves by inserting the interval D determined based on equation (13), which is a function of the targeted velocity Vd, every at least one cycle of the normative driving waves.

$$D = g(Vd) \tag{13}$$

When the velocity deviation control mode is selected, the auto-mode normative driving wave generating part 130 generates the auto-mode driving waves by inserting the interval D determined based on equation (14), which is a function of the velocity deviation Dv, every at least one cycle of the normative driving waves.

$$D = g(Dv) \tag{14}$$

The normative driving wave generating part 130 is configured so as to generate the auto-mode normative driving waves by inserting the interval D, every at least one cycle of the normative driving waves in the number of times determined by the driving wave number determining part 126 to output the auto-mode normative driving wave to another terminal of the normative driving wave choosing part 131.

The normative driving wave choosing part 131 outputs the manual-mode normative driving waves or the auto-mode normative driving waves to the driving wave generating part 14, depending to the manual-auto mode selecting signal received by the manual-auto mode selecting signal receiving part 156.

The driving wave generating part 14 includes a frequency-changing unit 141 and an amplitude-changing unit 142.

The frequency changing unit 141 is configured so as to generate a first driving waves having the same phase as the normative driving waves selected at the normative driving wave choosing part 131, and a second driving waves having a phase difference in 90 degrees to the normative driving waves.

The amplitude-changing unit 142 is configured so as to amplify the first driving waves and the second driving waves to supply them to the ultrasonic motor 62.

The frequency of the amplified first and second driving waves can be modified by changing the targeted frequency set at the targeted frequency setting part 157.

The amplitude of the amplified first and second driving waves can be modified by changing the targeted amplitude set at the targeted amplitude setting part 158.

The first and second driving waves output from the power amplifying unit 142 are supplied to the piezoelectric element of the ultrasonic motor 62 at right angles each other. In result, the piezoelectric element moves elliptically, and drives the driven object 61 linearly.

Figure 13A:
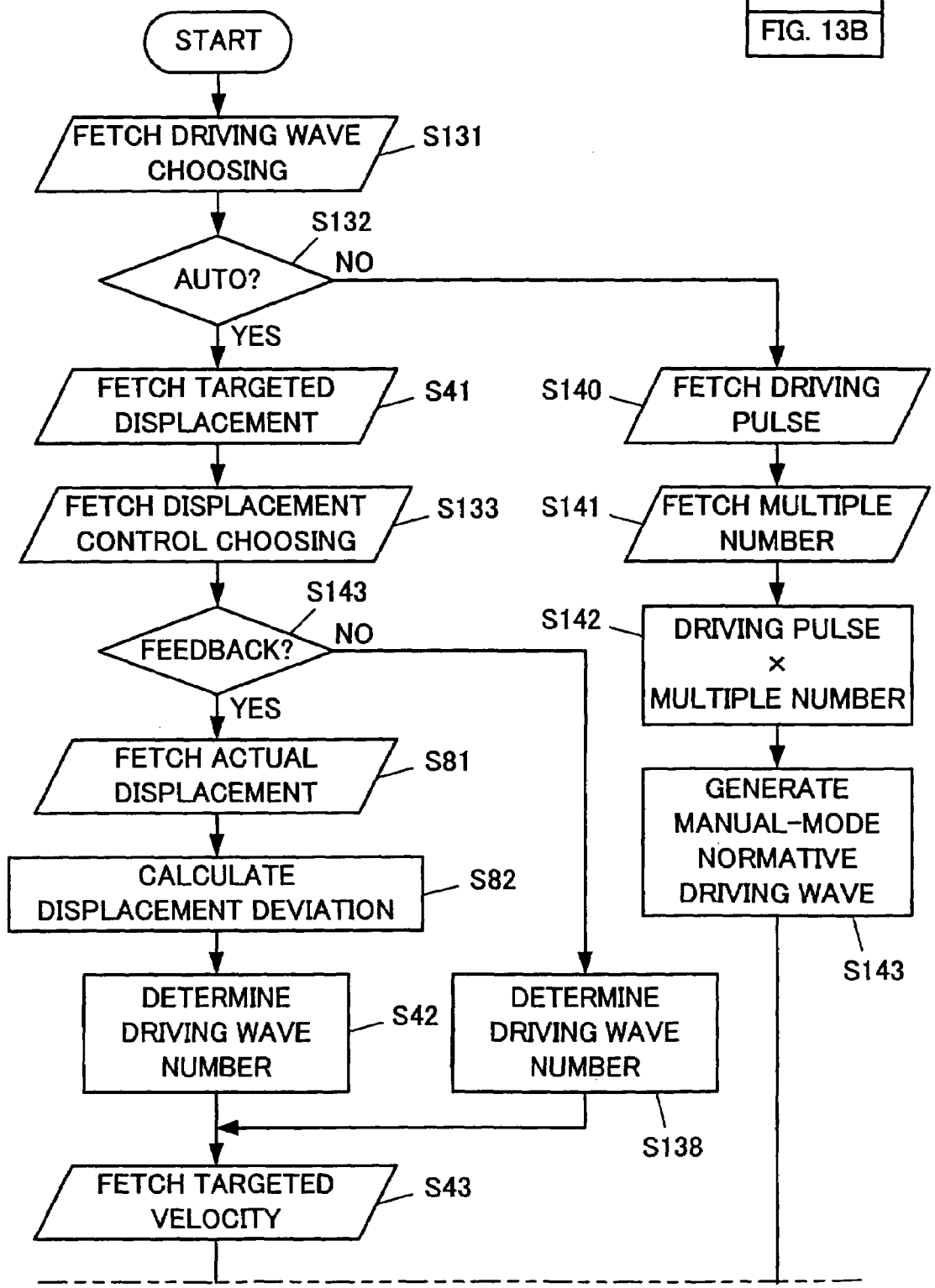
FIG. 13A and FIG. 13B are flowcharts of a forth control program executed in the microprocessor of the fifth embodiment.
Figure 13B:
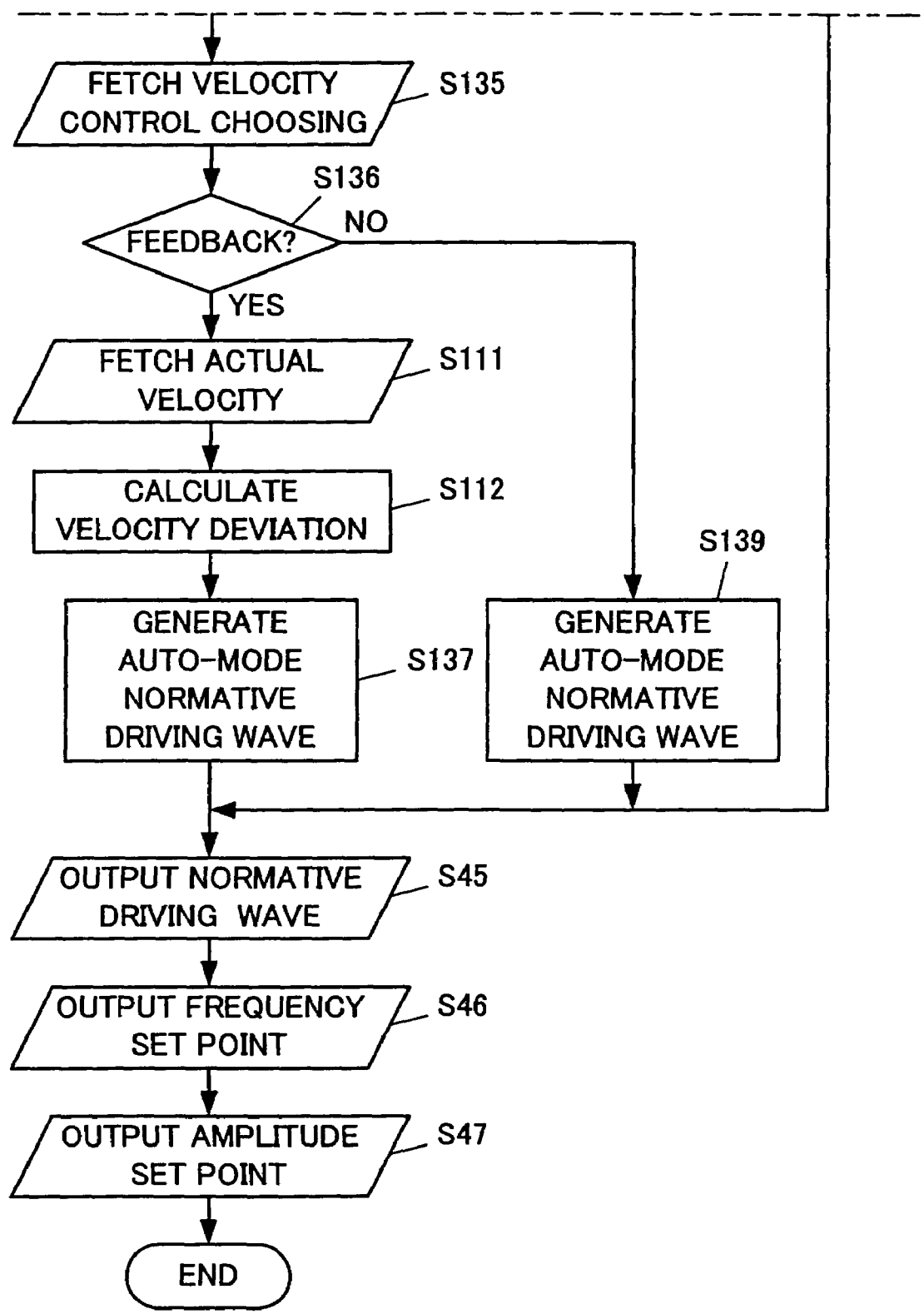

The microprocessor 12 executes the program shown in FIG. 13 to generate the normative driving waves.

The microprocessor 10 fetches the normative driving wave choosing signal at step S131, and determines whether or not the auto-mode is chosen at step S132.

The microprocessor 10 fetches the targeted displacement Xd at step S41 and the displacement control-mode choosing signal at step 133, and determines whether or not the displacement feedback mode is selected at step S134, when the microprocessor 12 determines that the auto-mode is chosen.

The microprocessor 10 fetches the actual displacement of the driven object 61 at step S81, calculates the displacement deviation defined by the deviation between the targeted displacement and the actual displacement at step S82, and determines the driving wave number n based on the displacement deviation at step S42, when the microprocessor 12 determines that the displacement feedback mode is selected.

The microprocessor 10 determines the driving wave number based on the targeted displacement at step S138, when the microprocessor determined that the displacement feedback mode is not selected.

The microprocessor 12 fetches the targeted velocity Vd at step S43, and the velocity control-mode choosing signal at step S135, and determines whether or not the velocity feedback mode is chosen at step S136.

The microprocessor 10 fetches the actual velocity of the driven object 61 at step S111, calculates the velocity deviation defined as the deviation between the targeted velocity and the actual velocity at step S112, and generates the auto-mode normative driving waves in which the interval determined based on the velocity deviation is inserted every at least one cycle of the normative driving waves at step S137, when the microprocessor 12 determines that the velocity feedback mode is chosen.

The microprocessor 10 generates the auto-mode normative driving waves in which the interval determined based on the targeted velocity is inserted every at least one cycle of the normative driving waves at step S139, when the microprocessor 12 determines that the velocity feedback mode is not chosen.

On the other hand, the microprocessor 12 fetches the driving pulses at step S140, and the multiplier at step S141, when the microprocessor 12 determines that the manual mode is chosen.

The microprocessor 12 multiplies the number of the driving pulses by the multiplier at step S142, and generates the manual-mode normative driving waves in the number of times equal to the product at step S143.

At step S45, the microprocessor 12 outputs the auto-mode normative driving waves generated at step S137 or step S139, when the auto mode is selected.

At step S45, the microprocessor 12 outputs the manual-mode normative driving waves generated at step S143, when the manual-mode is selected.

Finally, the microprocessor 12 outputs the targeted frequency at step S46, and the targeted amplitude at step S47.

In the above description, the embodiment in which one ultrasonic motor driver moves the driven object with respect to a specific one direction is explained.

One ultrasonic motor driver can control a plurality of ultrasonic motors, when the driven object is moved with respect to a plurality of directions or axes.

In the above description, the ultrasonic motor driver applying the control apparatus of the ultrasonic motor according to the forth invention, a person with ordinary skill in the art can understand that the control apparatus of the ultrasonic motor according to one of the first, the second, or the third invention may be applied to the ultrasonic motor driver.

Figure 14:
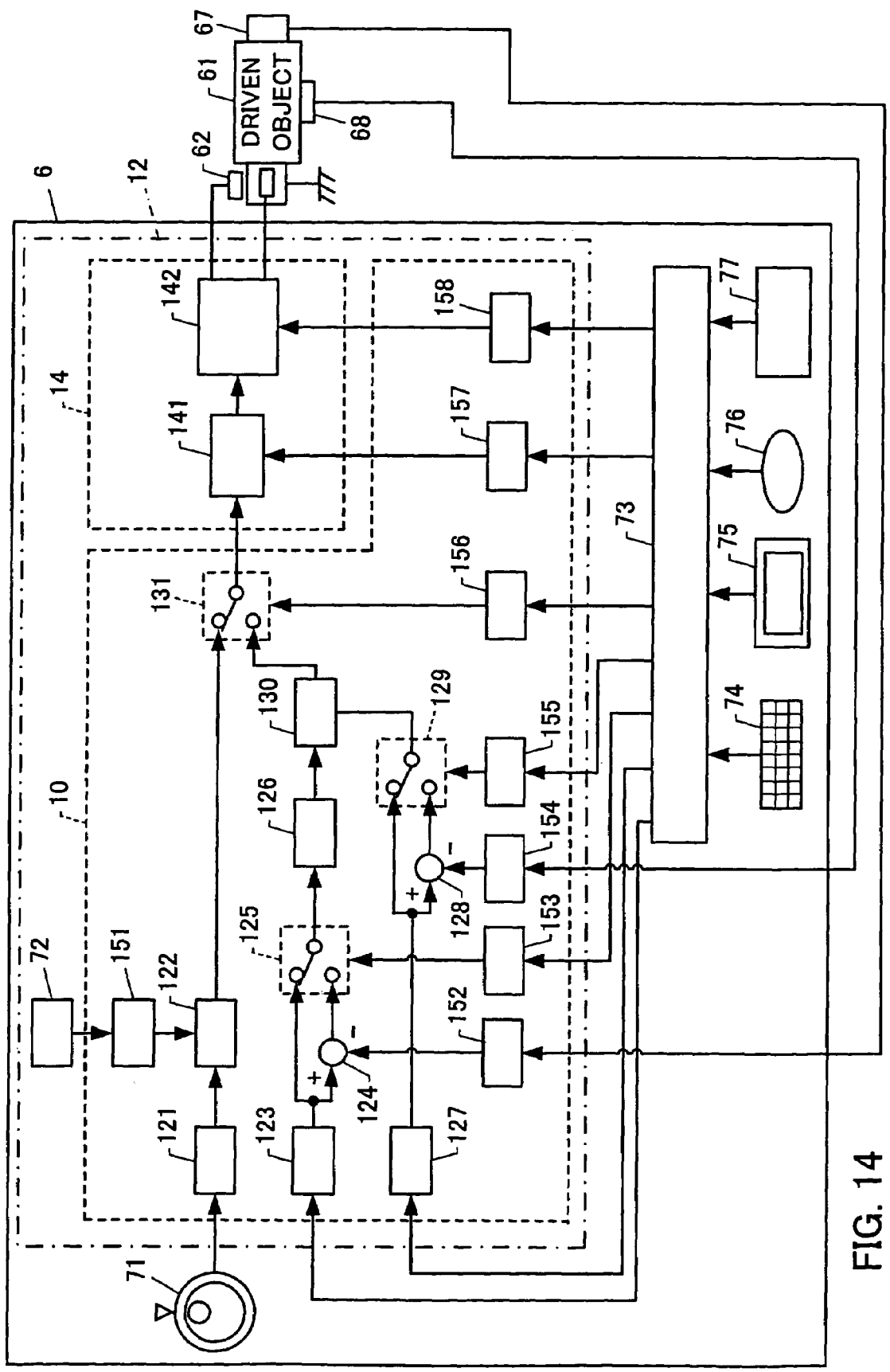
FIG. 14 is a block diagram of a sixth embodiment of the controller of the ultrasonic motor according to the present invention.

It is possible to configure a ultrasonic motor controller as shown in FIG. 14, by adopting the above-mentioned ultrasonic motor driver.

An ultrasonic motor controller according to a sixth invention includes not only the ultrasonic motor driver according to the fifth invention, but also a driving pulse generating part 71 such as a rotary encoder to generate driving pulses supplied to the driving pulse receiving part 121, a multiplier changing part 72 to change the multiplier set at the multiplier setting part 151, an actual displacement measuring part 67 to measure the actual displacement of the driven object 61, an actual velocity measuring part 68 to measure the actual velocity of the driven object 61, and an operation controlling part 73 functioning as a targeted displacement generating part, a targeted velocity generating part, a displacement control-mode choosing signal outputting part, a velocity control-mode choosing signal outputting part, and a normative driving wave choosing signal outputting part.

To the operation controlling part 73, a keyboard 74, a display panel 75, a buzzer 76, and a communication interface 77 are connected.

The operation controlling part 73 controls the ultrasonic motor driver 12 based on the operation signals input from the keyboard 74, displays the operating status on the display panel 75, and activates the buzzer if required.

The operation controlling part 73 can be connected to a personal computer and/or an instrument using RS-232C or GP-IP though the communication interface 77.

Therefore, the displacement of the driven object may be set by the personal computer, and the auto-manual mode, the displacement control-mode and the velocity control-mode may be changed by the personal computer.

The ultrasonic motor controller 6 according to the present invention includes an electric power equipment to generate a first electric power for driving the ultrasonic motor driver and a second electric power for supplying to the ultrasonic motor.

In the above description, the ultrasonic motor controller 6 moves the driven object 61 with respect to a specific one direction, but the ultrasonic motor controller 6 may move the driven object with respect to a plurality of directions and/or axes.

Figure 15:
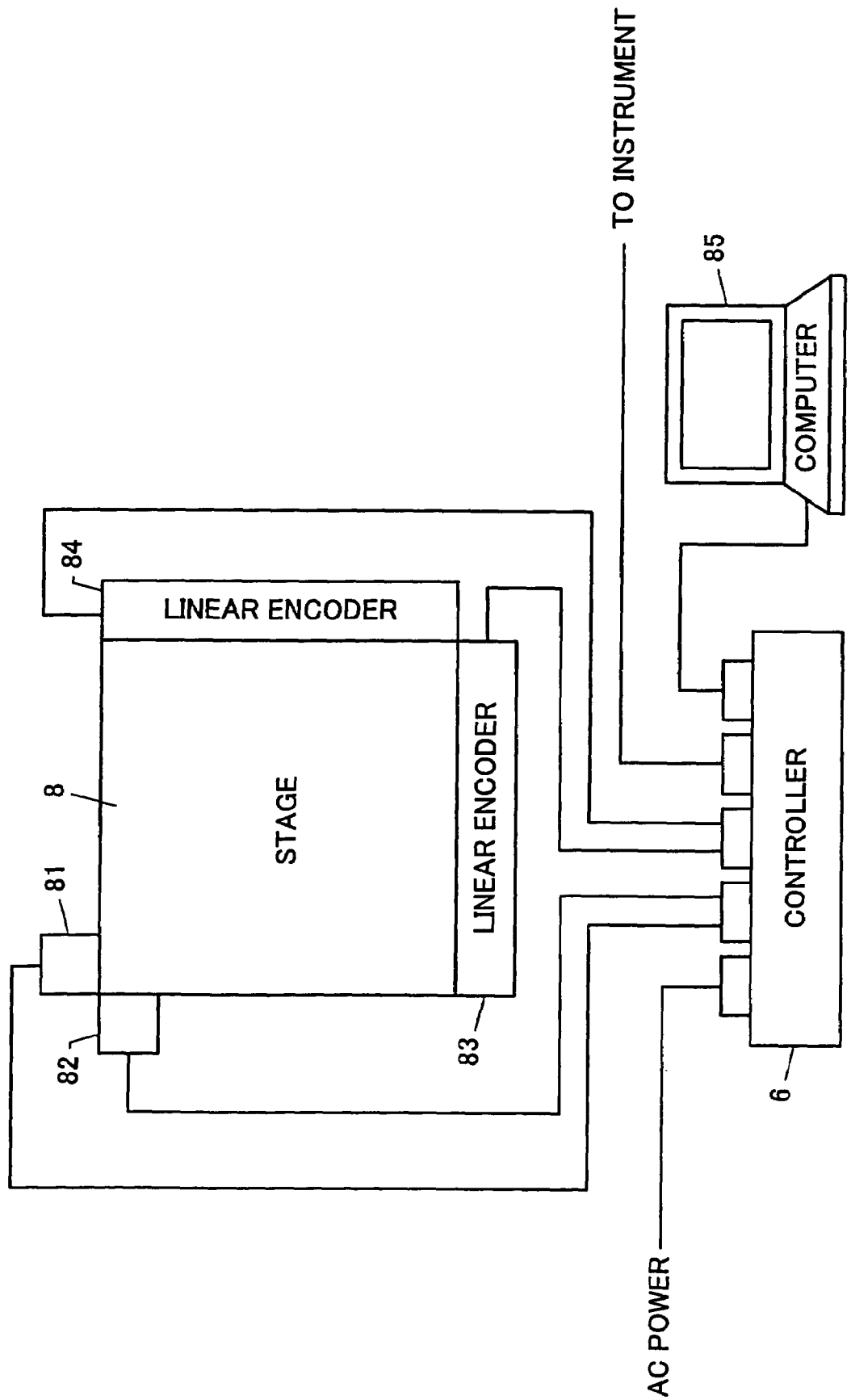
FIG. 15 is a block diagram of a stage control system applying the ultrasonic motor controller according the present invention.

When the ultrasonic motor controller moves the stage of the microscope along the X-axis and Y-axis, two driving waves for driving the ultrasonic motor output from the ultrasonic motor controller 7 are supplied to the X-axis ultrasonic motor 81 which moves the stage 8 to the X-axis direction, and the Y-axis ultrasonic motor 82 which moves the stage 8 to the Y-axis direction shown in FIG. 15.

The X-axis displacement measured by the linear encoder 83 attached to the X-axis of the stage 8, and the Y-axis displacement measured by the linear encoder 84 attached to the Y-axis of the stage 8 are fed back to the ultrasonic motor controller 7. In this system, the velocity feedback is not applied.

The ultrasonic motor controller 7 is connected to a personal computer 85 through RS-232C, and the personal computer 85 works as a maintenance tool and/or an operation tool.

The ultrasonic motor controller 7 may be connected to measuring instruments not shown in FIG. 15, in order to monitor the operating status of the ultrasonic motor controller 7.

In the above description, the multiplier set in the multiplier setting part 151 is changed by the multiplier changing part 72, but the multiplier may be changed by the operation controlling part 73.

In the above description, the ultrasonic motor controller applying the ultrasonic motor driver according to the fifth embodiment, a person with ordinary skill in the art can easily understand that the ultrasonic motor controller can be configured with the ultrasonic motor driver applying one of the first to the third embodiment.

What is claimed is:

1. A control apparatus of an ultrasonic motor, comprising:
   a driving pulse receiving means for receiving one or a plurality of driving pulses to energize an ultrasonic motor which drives a driven object every predetermined interval;
   a normative driving wave generating means for generating continuously normative driving waves, the numbers of which are equal to the numbers of driving pulses received at said driving pulse receiving means multiplied by a predetermined multiplier; and
   a driving wave generating means for generating driving waves having a predetermined frequency and a predetermined amplitude based on the normative driving waves generated at said normative driving wave generating means.

2. A control apparatus of an ultrasonic motor, comprising:
   a driving wave number determining means for determining a driving wave number based on the targeted displacement of a driven object driven by the ultrasonic motor;
   a normative driving wave generating means for generating continuously normative driving waves in the number of times determined at said driving wave number determining means, inserted an interval determined based on the targeted velocity of the driven object, every at least one cycle of the normative driving waves; and
   a driving wave generating means for generating driving waves having the predetermined frequency and the predetermined amplitude based on the normative driving waves generated at said normative driving wave generating means.

3. A control apparatus of an ultrasonic motor as set forth in claim 2, wherein said normative driving wave generating means makes the interval longer as the targeted velocity of the driven object is small.

4. A control apparatus of an ultrasonic motor, comprising:
   a displacement deviation calculating means for calculating a displacement deviation defined by a deviation between the targeted displacement of a driven object driven by the ultrasonic motor and the actual displacement of the driven object;
   a driving wave number determining means for determining a driving wave number based on the displacement deviation calculated at said displacement deviation calculating means;
   a normative driving wave generating means for generating continuously normative driving waves in the number of times determined at said driving wave number determining means, inserted an interval determined based on the targeted velocity of the driven object, every at least one cycle of the normative driving waves; and
   a driving wave generating means for generating driving waves having the predetermined frequency and the predetermined amplitude based on the normative driving waves generated at said normative driving wave generating means.

5. A control apparatus of an ultrasonic motor as set forth in claim 4, wherein said normative driving wave generating means makes the interval longer as the targeted velocity of the driven object is small.

6. A control apparatus of an ultrasonic motor, comprising:
   a displacement deviation calculating means for calculating a displacement deviation defined by a deviation between the targeted displacement of a driven object driven by the ultrasonic motor and the actual displacement of the driven object;
   a driving wave number determining means for determining a driving wave number based on the displacement deviation calculated at said displacement deviation calculating means;
   a velocity deviation calculating means for calculating a velocity deviation defined by a deviation between the targeted velocity of the driven object and the actual velocity of the driven object;
   a normative driving wave generating means for generating continuously normative driving waves in the number of times determined at said driving wave number determining means, inserted an interval determined based on the velocity deviation calculated at said velocity deviation calculating means, every at least one cycle of the normative driving waves; and
   a driving wave generating means for generating driving waves having the predetermined frequency and the predetermined amplitude based on the normative driving waves generated at said normative driving wave generating means.

7. A control apparatus of an ultrasonic motor as set forth in claim 6, wherein said normative driving wave generating means makes the interval longer as the velocity deviation is small.

8. A control apparatus of an ultrasonic motor as set forth in any one of claims 8 to 7, wherein said driving wave generating means further comprising at least one of a frequency-changing unit for changing the frequency of the normative driving waves and an amplitude-changing unit for changing the amplitude of the driving waves.

* * * * *

UNITED STATES PATENT AND TRADEMARK OFFICE
CERTIFICATE OF CORRECTION

PATENT NO.          : 7,154,209 B2                              Page 1 of 1
APPLICATION NO. : 10/737632
DATED                  : December 26, 2007
INVENTOR(S)        : Tadashi Fujinawa It is certified that error appears in the above-identified patent and that said Letters Patent is hereby corrected as shown below:

At Column 19, line 6, "claims 8 to 7," should read --claims 1 to 7,--

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,154,209 B2 | Page 1 of 1 |
| APPLICATION NO. | : 10/737632 | |
| DATED | : December 26, 2006 | |
| INVENTOR(S) | : Tadashi Fujinawa | |

It is certified that error appears in the above-identified patent and that said Letters Patent is hereby corrected as shown below:

At Column 19, line 6, "claims 8 to 7," should read --claims 1 to 7,--

This cerfificate supersedes Certificate of Correction issued April 24, 2007.

Signed and Sealed this

Twenty-second Day of May, 2007

JON W. DUDAS
*Director of the United States Patent and Trademark Office*